US010977325B2

(12) United States Patent
Mitra et al.

(10) Patent No.: US 10,977,325 B2
(45) Date of Patent: Apr. 13, 2021

(54) AUTOMATIC CONTEXT ADAPTIVE ENTERPRISE SEARCH AND RESULT GENERATION ON BEHALF OF A USER

(71) Applicant: International Business Machines Corporation, Armonk, NY (US)

(72) Inventors: Abhishek Mitra, Bangalore (IN); Suranjana Samanta, Bangalore (IN); Geetha Adinarayan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 16/202,043

(22) Filed: Nov. 27, 2018

(65) Prior Publication Data

US 2020/0167431 A1 May 28, 2020

(51) Int. Cl.
*G06F 16/953* (2019.01)
*G06F 16/9535* (2019.01)
*G06F 16/2457* (2019.01)
*G06F 40/30* (2020.01)

(52) U.S. Cl.
CPC .... *G06F 16/9535* (2019.01); *G06F 16/24575* (2019.01); *G06F 40/30* (2020.01)

(58) Field of Classification Search
CPC .......... G06F 16/9535; G06F 16/24575; G06F 16/36; G06F 40/30
USPC ......................................... 707/732, 734, 738
See application file for complete search history.

(56) References Cited

U.S. PATENT DOCUMENTS

| 8,620,909 | B1* | 12/2013 | Rennison | G06F 16/319 |
| | | | | 707/723 |
| 8,874,552 | B2 | 10/2014 | Jehuda | |
| 9,390,161 | B2* | 7/2016 | Shehata | G06F 16/345 |
| 9,875,298 | B2 | 1/2018 | Qiao | |
| 2002/0049750 | A1* | 4/2002 | Venkatram | G06N 5/022 |
| 2003/0187941 | A1* | 10/2003 | Suzuki | H04L 51/12 |
| | | | | 709/206 |
| 2012/0296746 | A1 | 11/2012 | Bleadall et al. | |
| 2014/0089324 | A1* | 3/2014 | Ellsworth | G06F 16/48 |
| | | | | 707/748 |
| 2016/0224547 | A1* | 8/2016 | Agrawal | G06F 16/93 |
| 2016/0267191 | A1 | 9/2016 | Khosravy et al. | |
| 2018/0068225 | A1* | 3/2018 | Miyoshi | G06N 5/022 |

* cited by examiner

*Primary Examiner* — Hares Jami
(74) *Attorney, Agent, or Firm* — North Shore Patents, P.C.; Michele Liu Baillie (57) ABSTRACT

In an automatic context adaptive search and result generation, a server obtains an email corpus of a user for a current time period. The server identifies a set of triggering semantics in the email corpus, and using an ontology, identifies a set of topic-context pairs corresponding to each triggering semantic. The server identifies a set of paths in the ontology activated by the set of topic-context pairs and compares the set of activated paths with paths in each heatmap of a set of heatmaps, where each heatmap corresponds to a document in a set of documents. The server identifies one or more heatmaps of the set of heatmaps including one or more paths matching an activated path of the set of activated paths. The server then outputs a search result including the one or more documents corresponding to the one or more heatmaps.

14 Claims, 7 Drawing Sheets

AUTOMATIC CONTEXT ADAPTIVE ENTERPRISE SEARCH AND RESULT GENERATION ON BEHALF OF A USER

BACKGROUND

Current enterprise search systems require a user to perform a search herself, requiring the user to spend time on query creation and subsequent screening of search results. Current systems further expect the user to explain the topic and context of the search in the most precise way for best results. Typically, the systems are designed and trained with certain assumptions on how and what a user will search. However, the dependency on the user to perform the searches create challenges to the efficacy of the search systems.

SUMMARY

Disclosed herein is a method for automatic context adaptive search and result generation for a user, and a computer program product and system as specified in the independent claims. Embodiments of the present invention are given in the dependent claims. Embodiments of the present invention can be freely combined with each other if they are not mutually exclusive.

According to an embodiment of the present invention, in automatic context adaptive search and result generation, a server obtains an email corpus of a user for a current time period. The server identifies a set of triggering semantics in the email corpus, and using an ontology, identifies a set of topic-content pairs corresponding to each triggering semantic. The server identifies a set of paths in the ontology activated by the set of topic-context pairs and compares the set of activated paths with paths in each heatmap of a set of heatmaps, where each heatmap corresponds to a document in a set of documents. The server identifies one or more heatmaps of the set of heatmaps including one or more paths matching an activated path of the set of activated paths. The server then outputs a search result including the one or more documents corresponding to the one or more heatmaps.

DETAILED DESCRIPTION

Figure 1:
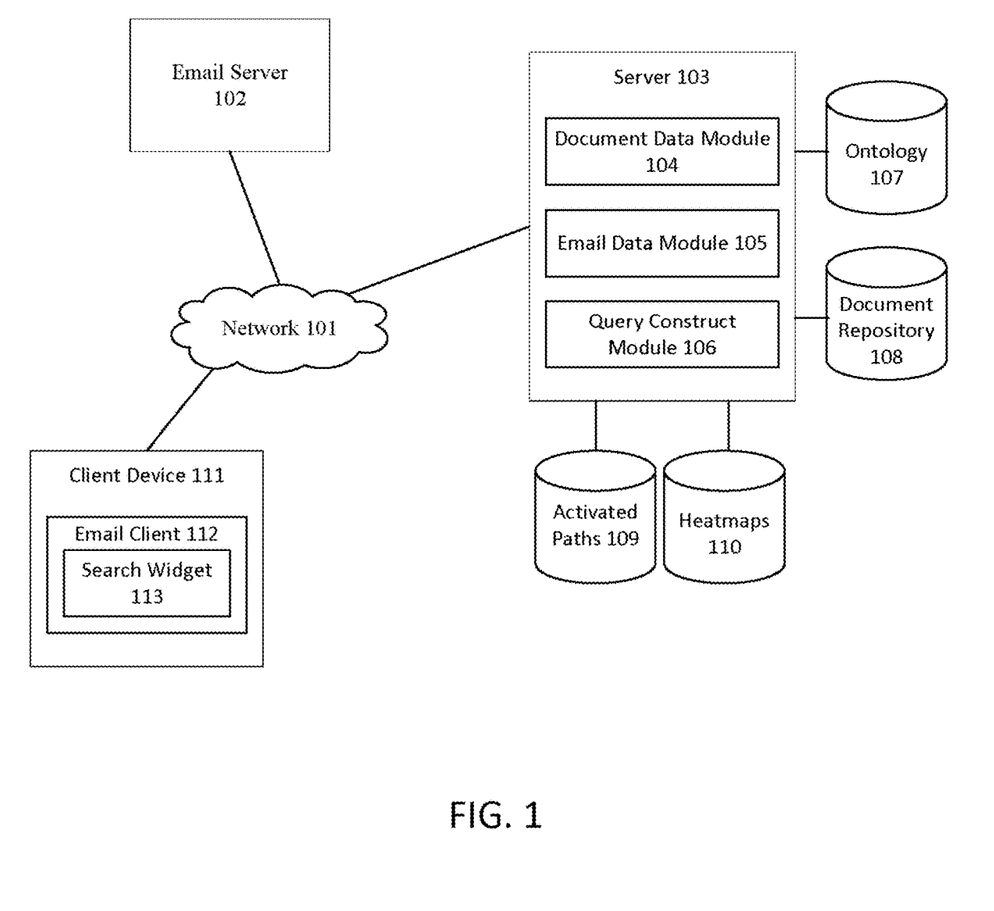
FIG. 1 illustrates an example network environment for the automatic context adaptive search and result generation according to embodiments of the present invention.

FIG. 1 illustrates an example network environment for the automatic context adaptive search and result generation according to embodiments of the present invention. The network 101 includes an email server 102, a server 103, and a client device 111. The email server 102 provides email service to an email client 112 at a client device 111. The email client 112 includes a search widget 113 that displays recommendations from automated document searches. The server 103 is coupled to an enterprise ontology 107 and an enterprise document repository 108 comprising a set of documents. The ontology 107 captures semantic entities in an organization and their relationships, including common terms in this domain. The server 103 includes a document data module 104, an email data module 105, and a query construct module 106. The document data module 104 analyzes the content of the set of documents in the document repository 108 and creates heatmaps 110 for the set of documents. As new documents are added to the document repository 108, the document data module 104 creates new heatmaps 110. The email data module 105 obtains, from the email server 102, an email corpus for a user of the email client 112 for a time period, identifies topic-context pairs in the email corpus, and identifies' paths 109 in the ontology 107 activated by the topic-context pairs. Using the activated paths 109 and the heatmaps 110, the query construct module 106 searches the document repository 108 to identify documents relevant to the user's current needs, as extrapolated from the email corpus. The query construct module 106, via the email server 102, outputs a search result to the email client 112, and the search result is displayed to the user via the search widget 113. The server 103 is configured to perform the above described process periodically according to a configured time interval. The functionalitles of the document data module 104, the email data module 105, and the query construct module 106 are described, further below.

Figure 2:
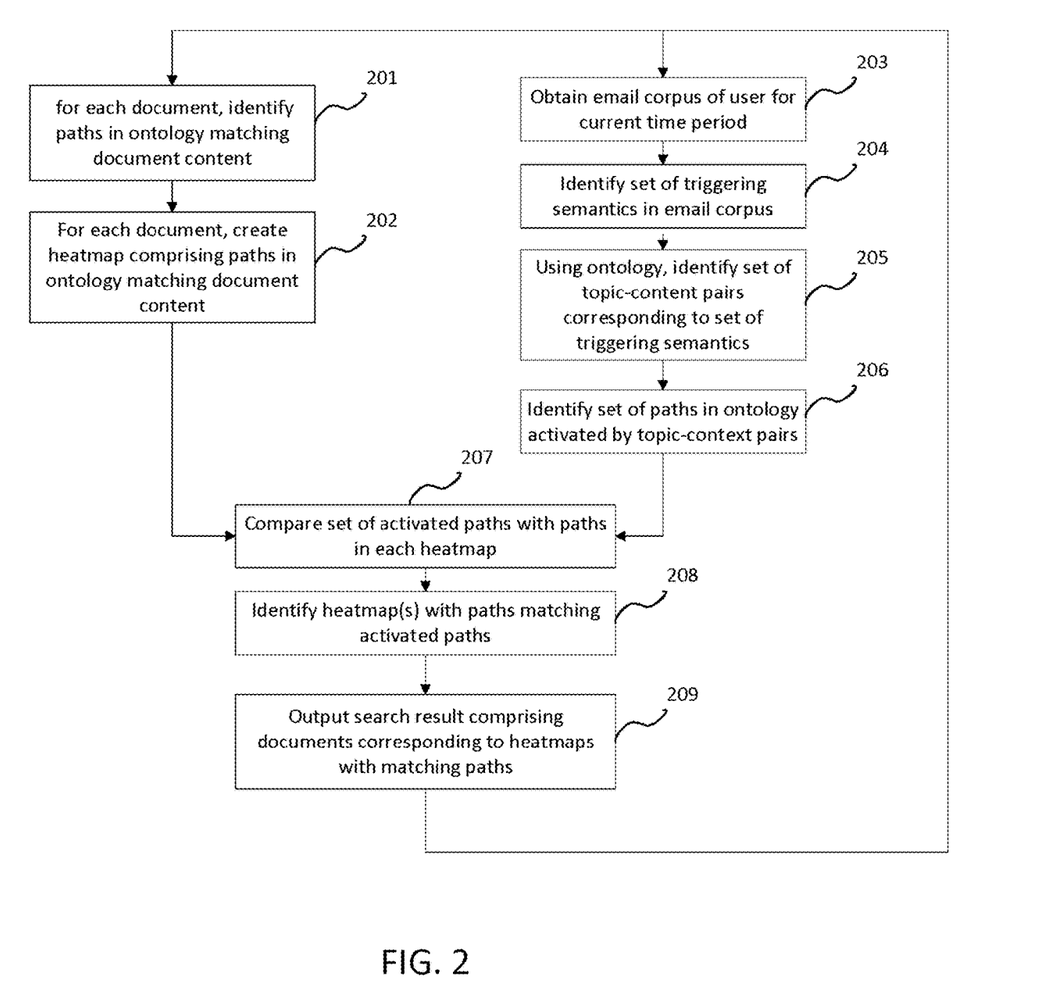
FIG. 2 illustrates a method for the automatic context adaptive search and result generation according to embodiments of the present invention.

FIG. 2 illustrates a method for the automatic context adaptive search and result generation according to embodiments of the present invention. The document, data module 104 parses each document in a set of documents stored in the document repository 108 to extract each document's content. For each document, the document data module 104 identifies paths in the ontology 107 matching the document content (201). When the ontology 107 is expressed in a tree structure, a path includes one or more levels of nodes in the ontology 107, from the root node to a leaf node and through any intermediate nodes. The document data module 104 creates a heatmap for each document, each heatmap comprising the paths in the ontology 107 matching the document content (202). In some embodiments, blocks 201-202 are repeated when documents are modified, added, or removed from the document repository 108.

Figure 3:
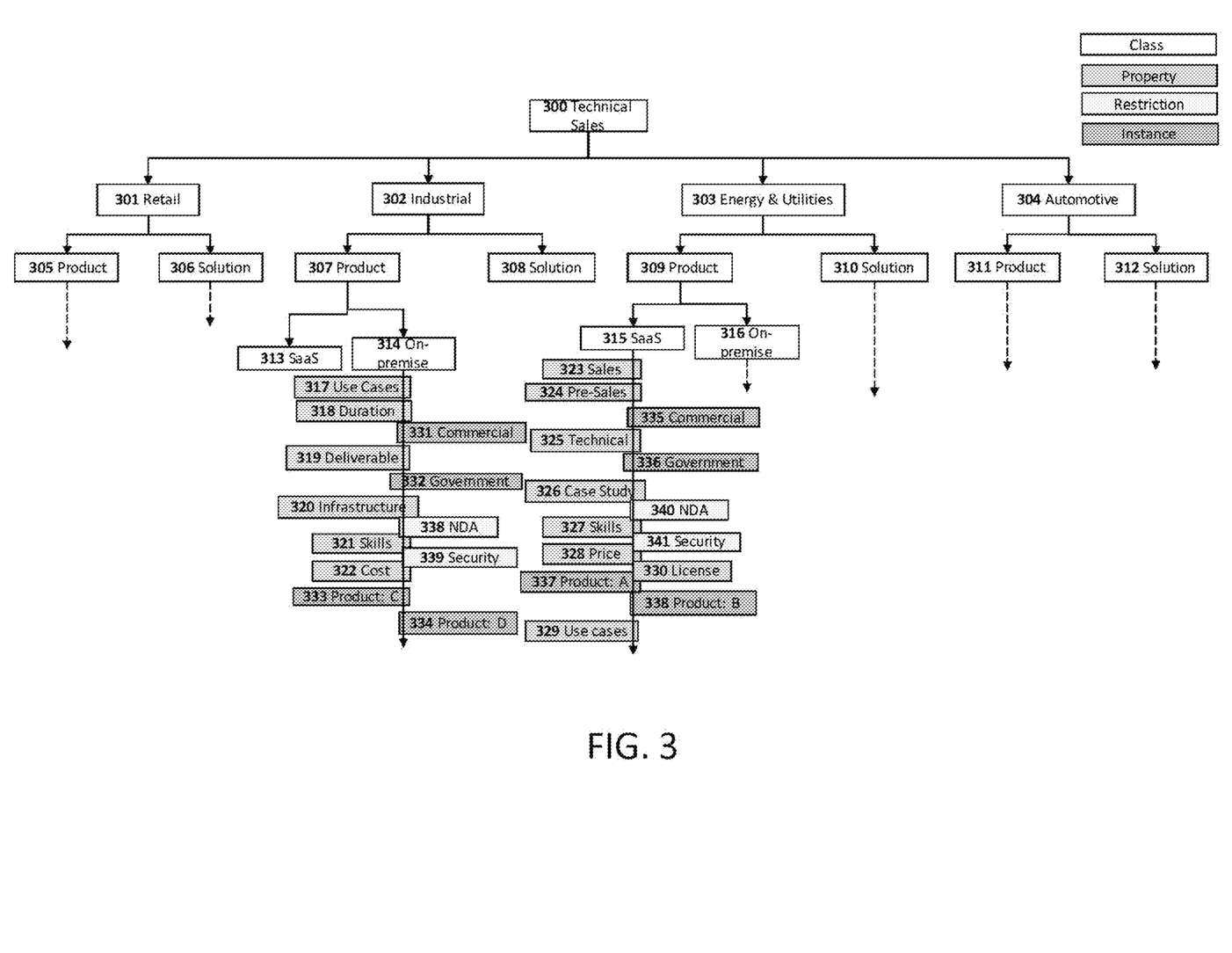
FIG. 3 illustrates a portion of a simplified example ontology.

FIG. 3 illustrates a portion of a simplified example ontology built for a technical sales group within an IT company. Here, the ontology contains a tree structure includes classes, properties, restrictions, and instances as nodes, with connections between the nodes reflecting their relationships. The technical sales domain is represented by the root entity, Technical Sales 300. Technical Sales 300 includes several classes 301-304, each of which with one or more levels of sub-classes 305-316. Each class includes one or more properties 317-330 describing their corresponding class or sub-class. Each property may include one or more instances 331-337 and/or one or more restrictions 338-341. For example, as illustrated in the ontology in FIG. 3, Technical Sales 300 has four product lines, represented by entities Retail 301, Industrial 302, Energy & Utilities 303, and Automotive 304. Each product line has sub-classes of Products and Solutions. For example, Products 307 include On-premise products 314, and Products 309 includes SaaS products 315. The properties 317-322 related to the On-premise product are represented as child nodes of the On-premise entity 314. The instances 331-334 and restrictions 338-341 for the On-premise product are represented as child nodes of their corresponding property entities. Similarly, the properties 323-330 related to the SaaS product are represented as child nodes of the SaaS entity 315. The instances 335-337 and restrictions 340-341 of the SaaS product are represented as child nodes of their corresponding property entities.

Returning to FIG. 2, in parallel with blocks 201-202, the email data module 105 obtains an email, corpus of a user for a current time period from the email server 102 (203). The server 103 is configured with permission to access the user's email from the email server 102 and is further configured with a time interval for which email corpora are obtained. For example, a time interval of 24 hours may be configured, where the email data module 105 periodically obtains the entails for the user from the past 24 hours. Using natural language processing, the email data module 105 parses the email corpus and identifies a set of triggering semantics in the email corpus (204). Example triggering semantics include, but are not limited to, words) indicating that the user is looking for information or has a need related to a particular topic. Using the ontology 107, the email data module 105 identifies a set of topic-context pairs corresponding to the set of triggering semantic (205). The email data module 105 then identifies a set of paths 109 in the ontology 107 activated by, i.e. matched to, the set of topic-context pairs (206). The set of activated paths 109 represent the search query to be applied to the set of documents.

The query construct module 106 compares the set of activated paths 109 for the email corpus with the paths in each heatmap 110 for the set of documents (207). The query construct module 106 identifies paths in the heatmaps 110 matching an activated path 109 (208). A path in a heatmap is considered to "match" an activated path when the paths intersect. The query construct module 106 outputs a search result comprising documents corresponding to the heatmaps with matching paths to the email server 102 to be displayed to the user via the search widget 113 (209).

Figure 4:
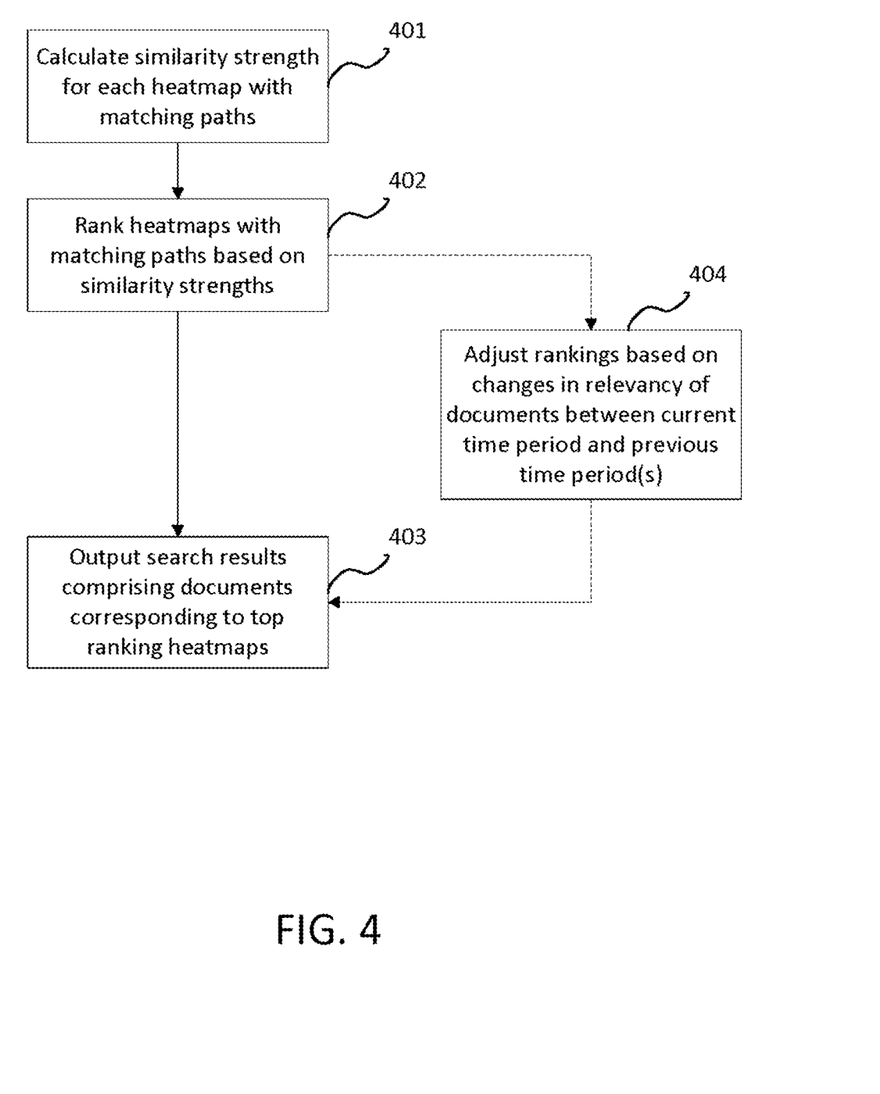
FIG. 4 illustrates in more detail the identification of paths in heatmaps matching activated paths according to embodiments of the present invention.

FIG. 4 illustrates in more detail the identification of paths in heatmaps matching activated paths according to embodiments of the present invention. The query construct module 106 calculates a similarity strength for each heatmap with matching paths (401). The similarity strength represents the level of similarity between the paths in heatmaps and the activated paths. The query construct module 106 ranks the heatmaps with the matching paths based on the similarity strengths (402) and outputs the search result comprising the documents corresponding to the top-ranking heatmaps to be displayed to the user via the search widget 113 (403). For example, the query construct, module 106 can be configured to output documents corresponding to the top 10% of the ranked heatmaps.

Figure 5:
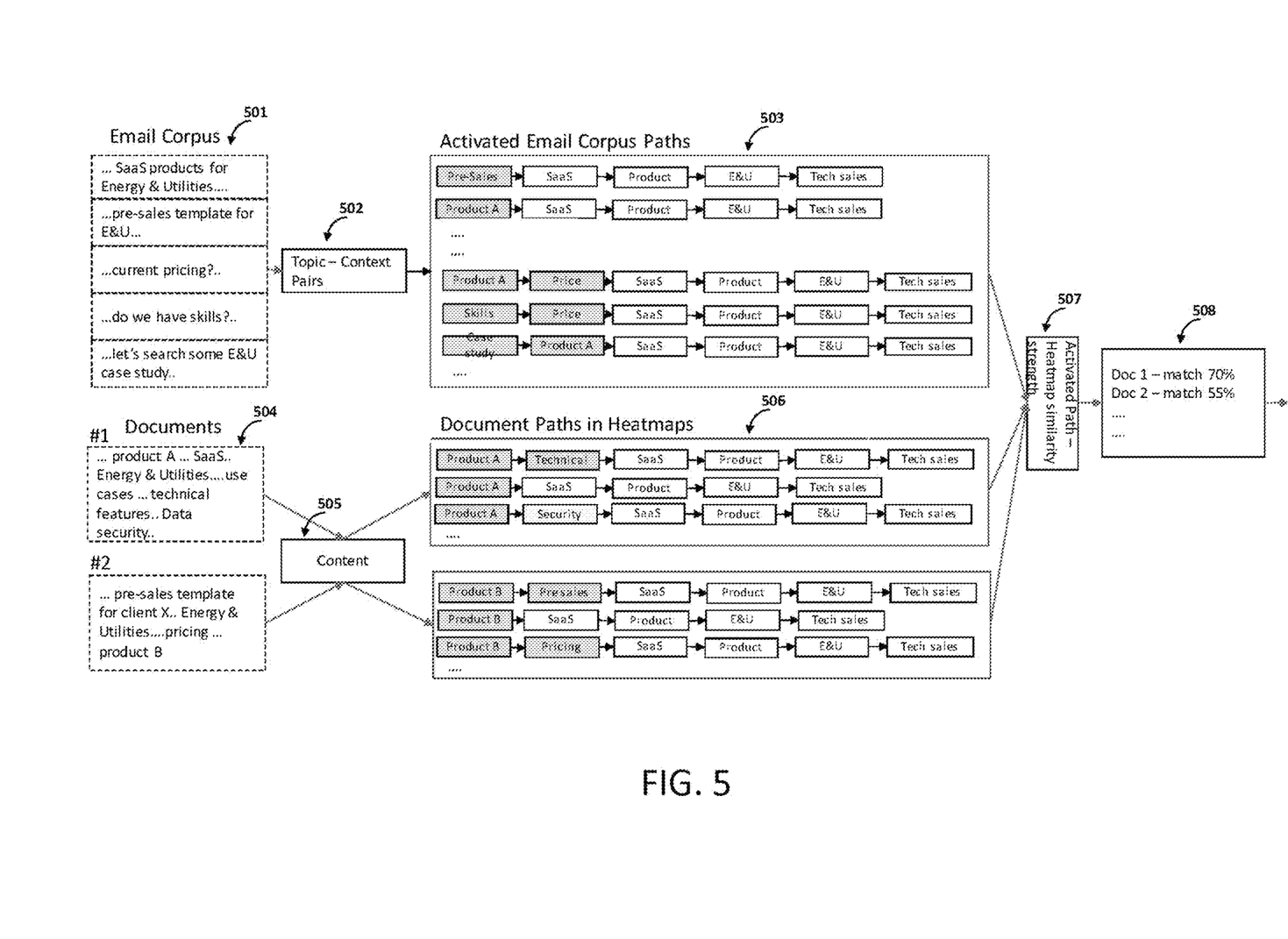
FIG. 5 illustrates an example automatic context adaptive search and result generation according to embodiments of the present invention.

FIG. 5 illustrates an example automatic context adaptive search and result generation according to embodiments of the present invention. Referring to FIGS. 2-4, the email data module 105 obtains an email corpus 501 of a user for a current time period (203) and identifies triggering semantics in the email corpus 501 (204). Using the ontology of FIG. 3, the email data module 105 identifies topic-context pairs 502 corresponding to each triggering semantic (205) and identifies paths 503 in the ontology 107 activated by the topic-context pairs (206). In parallel with blocks 203-206, for each document in the set of documents 504, the document data module 104 identifies paths in the ontology of FIG. 3 matching the document's content 505 (201). For each document in the set 504, the document data module 104 creates a heatmap 506 comprising paths in the ontology matching the document content (203). The query construct module 106 compares the activated paths 503 with the paths in each heatmap 506 (207) and identifies paths in the heatmaps 506 matching an activated path 503 (208). The heatmaps 506 with matching paths are then ranked based on their similarity strengths 507 (401-402), as described above. The query construct module 106 outputs the search result 508 comprising the documents corresponding to the top-ranking heatmaps (403).

Returning to FIG. 4, the query construct module 106 optionally adjusts the rankings based on changes in relevancy of documents between the current time period and previous time periods (404). In some embodiments, a time period is configured (e.g. 24 hours, 1 week, etc.), such that blocks 203-206 are repeated for each time period. As the user's needs change over time, the relevancy of documents may also change. The rankings of the heatmaps and their corresponding documents can be adjusted based on these changes. Some heatmaps with matching paths in the current time period may also have matching paths in previous time period(s). In some embodiments, semantics identified in the email corpus of the current time period are analyzed to determine whether and how the documents corresponding to these heatmaps continue to be relevant in the current time period. The temporal relevancy of the activated paths is thus judged by user need, and the ranking of the heatmaps are then adjusted accordingly. In some embodiments, the relevancy can be determined using any combination of the following: when semantics indicate that the user no longer requires information related to a certain activated path, then the heatmap with paths matching this activated path is weighted downward in relevancy; a part of the email corpus in an immediate, past previous time period can appear in the email corpus of the current time period. Any result generated from this part of the email corpus is weighted downward; when semantics in the email corpus of the current time period include conversations that indicate that a past recommendation was not adequate, the heatmap corresponding to this document is weighted downward; when semantics in the email corpus of the current time period include conversations that indicate continued interest in information related to a certain activated path, the heatmap with paths matching this activated path is weighted upward in relevancy; and the heatmap with new paths are weighed upward.

Figure 6:
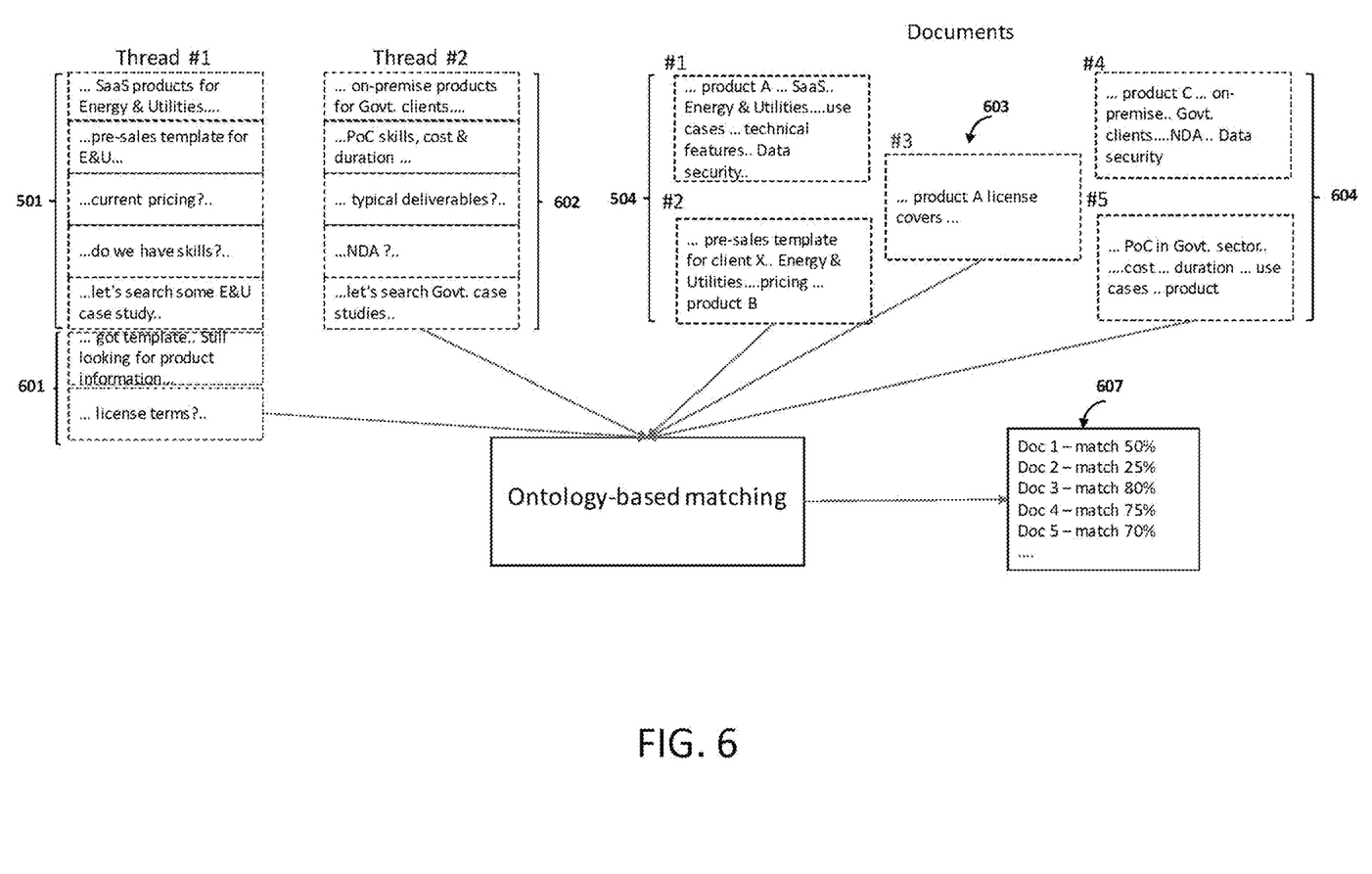
FIG. 6 illustrates an example adjustment of ranked heatmaps according to embodiments of the present invention.

FIG. 6 illustrates an example adjustment of ranked heatmaps according to embodiments of the present, invention. Using the examples illustrated in FIGS. 3 and 5, assume that for a subsequent, time period (i.e., new "current" time period), the email data module 105 obtains the email corpus of the user (203). The email data module 105 identifies additional topic-context pairs from new emails 601 in the email threads 501 from the last email corpus, as well as new topic/context pairs from emails 602 in a new email thread (204-205). The email data module 105 identifies the paths in the ontology of FIG. 3 activated by the topic-context pairs in this email corpus (206).

In parallel, assume that a new document 603 is added to the document, repository 108. For this example, assume that the document repository 108 already includes the documents ##1, 2, 4, and 5 (504 and 604) and that the heatmaps 110 include heatmaps for these documents. When the new document #3 (503) is added to the document repository 108, the document data module 104 identifies paths in the ontology of FIG. 3 matching the content of the new document 603 (201) and creates a heatmap comprising paths in the ontology matching the document's content (203). The heatmaps 110 are then updated to include the heatmap for the document 603.

The query construct module 106 then performs blocks 207-208 and 401-402 for the email corpus for the new current time period and the updated heatmaps, in the manner described above. The query construct module 106 further adjusts the rankings based on the changes in the relevancy of the documents between the new current time period and previous time periods (404), as described above. The search result comprising documents corresponding to the reranked heatmaps is then output (403). In this manner, the search results adapt to the user's needs over time.

Figure 7:
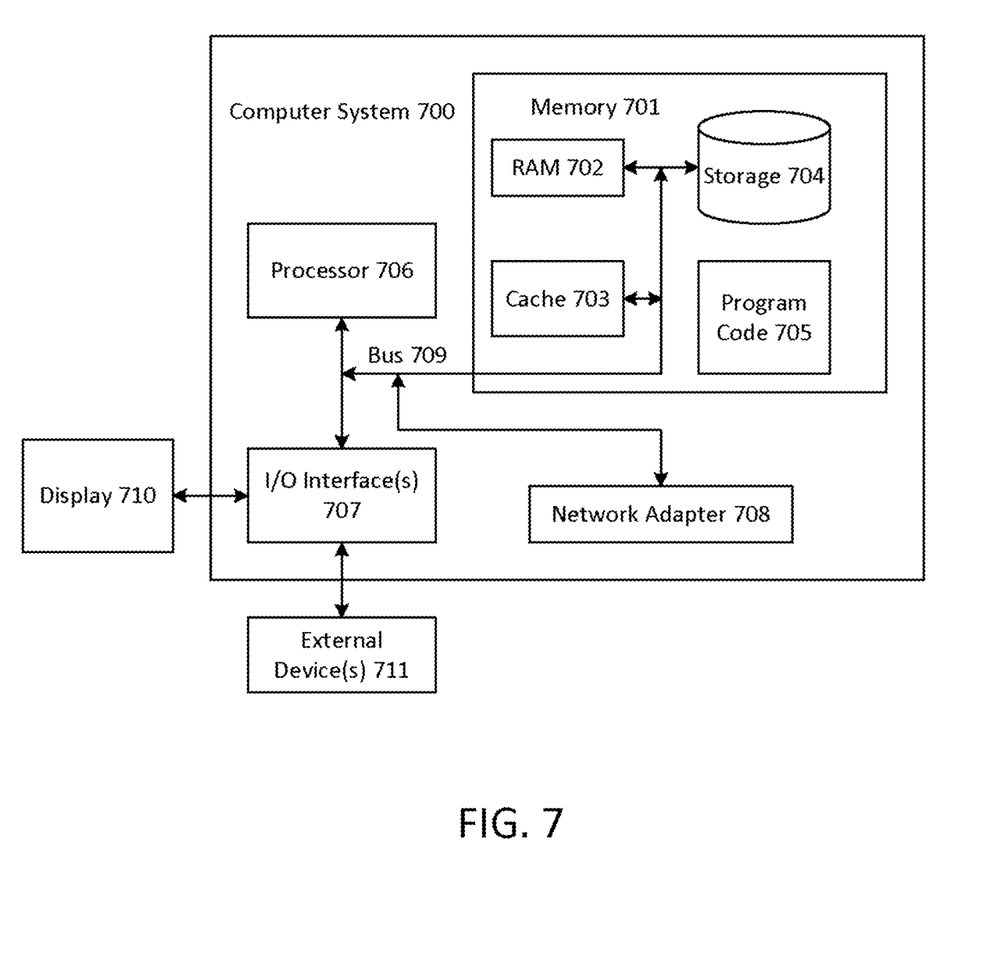
FIG. 7 illustrates a computer system, one or more of which implements the automatic context adaptive search and result generation according to embodiments of the present invention.

FIG. 7 illustrates a computer system, one or more of which implements the automatic context adaptive search and result generation according to embodiments of the present invention. The computer system 700 is operationally coupled to a processor or processing units 706, a memory 701, and a bus 709 that couples various system components, including the memory 701 to the processor 706. The bus 709 represents one or more of any of several types of bus structure, including a memory bus or memory controller, a peripheral bus, an accelerated graphics port, and a processor or local bus using any of a variety of bus architectures. The memory 701 may include computer readable media in the form of volatile memory, such as random access memory (RAM) 702 or cache memory 703, or non-volatile storage media 704. The memory 701 may include at least one program product having a set of at least one program code module 705 that are configured to carry out the functions of embodiment of the present invention when executed by the processor 706. The computer system 700 may also communicate with one or more external devices 711, such as a display 710, via I/O interfaces 707. The computer system 700 may communicate with one or more networks via network adapter 708.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented progamming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be, implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out, of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace or to enable others of ordinary skill in the art to understand the embodiments disclosed herein.

What is claimed is:

1. A method for automatic context adaptive search and result generation, comprising:
    obtaining, by a server, an email corpus of a user for a current time period;
    identifying, by the server, a set of triggering semantics in the email corpus;
    using an ontology, identifying, by the server, a set of topic-content pairs corresponding to each triggering semantic;
    identifying, by the server, a set of paths in the ontology activated by the set of topic-context pairs;
    comparing, by the server, the set of activated paths with paths in each heatmap of a set of heatmaps, each heatmap corresponding to a document in a set of documents;
    identifying, by the server, one or more heatmaps of the set of heatmaps comprising one or more paths matching an activated path of the set of activated paths, comprising:
        calculating, by the server, a similarity strength for each heatmap of the one or more heatmaps;
        ranking, by the server, the one or more heatmaps based on the similarity strength for each heatmap; and
        adjusting, by the server, the rankings of the one or more heatmaps based on changes in relevancy to the user of the set of documents between the current time period and one or more previous time periods; and
    outputting, by the server, a search result comprising one or more documents corresponding to top ranking heatmaps.

2. The method of claim 1, further comprising:
    for each document in the set of documents, identifying, by the server, a plurality of paths in the ontology matching a content of the document; and
    for each document in the set of documents, creating, by the server, a heatmap comprising the plurality of paths in the ontology matching the content of the document.

3. The method of claim 1, wherein the similarity strength comprises a level of similarity between the one or more paths in the heatmap and the activated path.

4. The method of claim 1, wherein the identifying of the set of triggering semantics comprises:
    identifying, by the server, one or more words in the email corpus indicating that the user is looking for information or has a need related to a given topic.

5. The method of claim 1, wherein the identifying of the one or more heatmaps comprises:
    identifying, by the server, the one or more heatmaps comprising the one or more paths intersecting the activated path.

6. A computer program product for automatic context adaptive search and result generation, the computer program product comprising a computer readable storage medium having program instructions embodied therewith, the program instructions executable by a processor to cause the processor to:
    obtain an email corpus of a user for a current time period;
    identify a set of triggering semantics in the email corpus;
    using an ontology, identify a set of topic-content pairs corresponding to each triggering semantic;
    identify a set of paths in the ontology activated by the set of topic-context pairs;
    compare the set of activated paths with paths in each heatmap of a set of heatmaps, each heatmap corresponding to a document in a set of documents;
    identify one or more heatmaps of the set of heatmaps comprising one or more paths matching an activated path of the set of activated paths, comprising:
        calculate a similarity strength for each heatmap of the one or more heatmaps;
        rank the one or more heatmaps based on the similarity strength for each heatmap; and
        adjust the rankings of the one or more heatmaps based on changes in relevancy to the user of the set of documents between the current time period and one or more previous time periods; and
    output a search result comprising one or more documents corresponding to top ranking heatmaps.

7. The computer program product of claim 6, wherein the processor is further caused to:
    for each document in the set of documents, identify a plurality of paths in the ontology matching a content of the document; and
    for each document in the set of documents, create a heatmap comprising the plurality of paths in the ontology matching the content of the document.

8. The computer program product of claim 6, wherein the similarity strength comprises a level of similarity between the one or more paths in the heatmap and the activated path.

9. The computer program product of claim 6, wherein in the identifying of the set of triggering semantics, the processor is further caused to:
identify one or more words in the email corpus indicating that the user is looking for information or has a need related to a given topic.

10. The computer program product of claim 6, wherein in the identifying of the one or more heatmaps, the processor is further caused to:
identify the one or more heatmaps comprising the one or more paths intersecting the activated path.

11. A system comprising:
a processor; and
a computer readable storage medium having program instructions embodied therewith, the program instructions executable by a processor to cause the processor to:
obtain an email corpus of a user for a current time period;
identify a set of triggering semantics in the email corpus;
using an ontology, identify a set of topic-content pairs corresponding to each triggering semantic;
identify a set of paths in the ontology activated by the set of topic-context pairs;
compare the set of activated paths with paths in each heatmap of a set of heatmaps, each heatmap corresponding to a document in a set of documents;
identify one or more heatmaps of the set of heatmaps comprising one or more paths matching an activated path of the set of activated paths, comprising:
calculate a similarity strength for each heatmap of the one or more heatmaps;
rank the one or more heatmaps based on the similarity strength for each heatmap; and
adjust the rankings of the one or more heatmaps based on changes in relevancy to the user of the set of documents between the current time period and one or more previous time periods; and
output a search result comprising one or more documents corresponding to top ranking heatmaps.

12. The system of claim 11, wherein the processor is further caused to:
for each document in the set of documents, identify a plurality of paths in the ontology matching a content of the document; and
for each document in the set of documents, create a heatmap comprising the plurality of paths in the ontology matching the content of the document.

13. The system of claim 11, wherein in the identifying of the set of triggering semantics, the processor is further caused to:
identify one or more words in the email corpus indicating that the user is looking for information or has a need related to a given topic.

14. The system of claim 11, wherein in the identifying of the one or more heatmaps, the processor is further caused to:
identify the one or more heatmaps comprising the one or more paths intersecting the activated path.

* * * * *